United States Patent [19]
Waldron et al.

[11] Patent Number: 6,009,121
[45] Date of Patent: Dec. 28, 1999

[54] METHOD AND DEVICE FOR GENERATING SIGNAL CONSTELLATIONS IN PCM SPACE FOR HIGH SPEED DATA COMMUNICATIONS

[75] Inventors: Mark A. Waldron, Gurnee, Ill.; Scott A. Lery, Nevada City, Calif.

[73] Assignee: 3Com Corporation, Santa Clara, Calif.

[21] Appl. No.: 08/957,698

[22] Filed: Oct. 24, 1997

[51] Int. Cl.[6] .................................................. H04B 1/10
[52] U.S. Cl. ........................ 375/254; 370/212; 332/107
[58] Field of Search ................................. 375/242, 254; 370/212; 332/107

[56] References Cited

U.S. PATENT DOCUMENTS

| | | | |
|---|---|---|---|
| 5,801,695 | 9/1998 | Townshend | 375/340 |
| 5,809,075 | 9/1998 | Townshend | 375/254 |
| 5,812,602 | 9/1998 | Humblet | 375/265 |
| 5,822,371 | 10/1998 | Goldstein et al. | 375/242 |
| 5,835,538 | 11/1998 | Townshend | 375/295 |
| 5,859,872 | 1/1999 | Townshend | 375/242 |
| 5,862,179 | 1/1999 | Goldstein et al. | 375/242 |
| 5,867,529 | 2/1999 | Cole | 375/242 |

*Primary Examiner*—Stephen Chin
*Assistant Examiner*—Lenny Jiang
*Attorney, Agent, or Firm*—McDonnell Boehnen Hulbert & Berghoff

[57] ABSTRACT

A method and device for generating a constellation of Pulse Code Modulation (PCM) levels to represent digital data in a communication system. The constellation of Pulse Code Modulation levels are selected to have a total number of PCM levels and an upper power limit that optimizes noise performance. PCM levels are selected to increase the minimum spacing between PCM levels as great as possible while staying within the upper power limit for a constellation having a desired number of PCM levels. To minimize the power level of the selected constellation, constellation points are selected starting from PCM levels at linear values near zero to PCM levels at higher linear values. To improve noise performance, the number of occurrences of the minimum distance between PCM levels is also reduced without exceeding the upper power level. To reduce occurrences of the minimum distance between constellation points, PCM levels at the minimum distance from the previously selected PCM level may be skipped. The number of PCM levels spaced at the minimum distance is thus reduced to an optimum number without exceeding the upper power level.

17 Claims, 8 Drawing Sheets

| 0 | 132 | 396 | 924 | 1980 | 4092 | 8316 | 16764 |
|---|---|---|---|---|---|---|---|
| 8 | 148 | 428 | 988 | 2108 | 4348 | 8828 | 17788 |
| 16 | 164 | 460 | 1052 | 2236 | 4604 | 9340 | 18812 |
| 24 | 180 | 492 | 1116 | 2364 | 4860 | 9852 | 19836 |
| 32 | 196 | 524 | 1180 | 2492 | 5116 | 10364 | 20860 |
| 40 | 212 | 556 | 1244 | 2620 | 5372 | 10876 | 21884 |
| 48 | 228 | 588 | 1308 | 2748 | 5628 | 11388 | 22908 |
| 56 | 244 | 620 | 1372 | 2876 | 5884 | 11900 | 23932 |
| 64 | 260 | 652 | 1436 | 3004 | 6140 | 12412 | 24956 |
| 72 | 276 | 684 | 1500 | 3132 | 6396 | 12924 | 25980 |
| 80 | 292 | 716 | 1564 | 3260 | 6652 | 13436 | 27004 |
| 88 | 308 | 748 | 1628 | 3388 | 6908 | 13948 | 28028 |
| 96 | 324 | 780 | 1692 | 3516 | 7164 | 14460 | 29052 |
| 104 | 340 | 812 | 1756 | 3644 | 7420 | 14972 | 30076 |
| 112 | 356 | 844 | 1820 | 3772 | 7676 | 15484 | 31100 |
| 120 | 372 | 876 | 1884 | 3900 | 7932 | 15996 | 32124 |

FIG. 4

| METHOD 1 | | |
|---|---|---|
| PCM | LINEAR | DELTA |
| 247 | 64 | 128 |
| 235 | 196 | 132 |
| 227 | 324 | 128 |
| 221 | 460 | 136 |
| 217 | 588 | 128 |
| 213 | 716 | 128 |
| 209 | 844 | 128 |
| 206 | 988 | 144 |
| 204 | 1116 | 128 |
| 202 | 1244 | 128 |
| 200 | 1372 | 128 |
| 198 | 1500 | 128 |
| 196 | 1628 | 128 |
| 194 | 1756 | 128 |
| 192 | 1884 | 128 |
| 190 | 2108 | 224 |
| 189 | 2236 | 128 |
| 188 | 2364 | 128 |
| 187 | 2492 | 128 |
| 186 | 2620 | 128 |
| 185 | 2748 | 128 |
| 184 | 2876 | 128 |
| 183 | 3004 | 128 |
| 182 | 3132 | 128 |
| 181 | 3260 | 128 |
| 180 | 3388 | 128 |
| 179 | 3516 | 128 |
| 178 | 3644 | 128 |
| 177 | 3772 | 128 |
| 176 | 3900 | 128 |
| 175 | 4092 | 192 |
| 174 | 4348 | 256 |
| 173 | 4604 | 256 |
| 172 | 4860 | 256 |
| 171 | 5116 | 256 |

FIG. 5A

| METHOD 2 | | |
|---|---|---|
| PCM | LINEAR | DELTA |
| 248 | 72 | 144 |
| 234 | 212 | 140 |
| 225 | 356 | 144 |
| 220 | 492 | 136 |
| 215 | 652 | 160 |
| 210 | 812 | 160 |
| 206 | 988 | 176 |
| 203 | 1180 | 192 |
| 200 | 1372 | 192 |
| 197 | 1564 | 192 |
| 194 | 1756 | 192 |
| 191 | 1980 | 224 |
| 189 | 2236 | 256 |
| 187 | 2492 | 256 |
| 185 | 2748 | 256 |
| 183 | 3004 | 256 |
| 181 | 3260 | 256 |
| 180 | 3388 | 128 |
| 179 | 3516 | 128 |
| 178 | 3644 | 128 |
| 177 | 3772 | 128 |
| 176 | 3900 | 128 |
| 175 | 4092 | 192 |
| 174 | 4348 | 256 |
| 173 | 4604 | 256 |
| 172 | 4860 | 256 |
| 171 | 5116 | 256 |
| 170 | 5372 | 256 |
| 169 | 5628 | 256 |
| 168 | 5884 | 256 |
| 167 | 6140 | 256 |
| 166 | 6396 | 256 |
| 165 | 6652 | 256 |
| 164 | 6908 | 256 |
| 163 | 7164 | 256 |

METHOD AND DEVICE FOR GENERATING SIGNAL CONSTELLATIONS IN PCM SPACE FOR HIGH SPEED DATA COMMUNICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to a method and device for selecting constellation points representing data transmitted in a data communication system. Although the invention may be applied to any data communication system, it is particularly suited for systems where constellation signal points are selected from non-uniformly spaced, single-dimenisional signal space.

B. Description of the Related Art

A majority of today's public telephone network transmits information digitally as a series of 8-bit bytes or octets at an 8 KHz clock rate. Portions of today's telephone network, however, are not equipped for direct digital transmission. For example, the subscriber loop between the telephone company and the subscriber's home is typically an analog channel. To transmit information over this analog channel, digital information is converted to an analog voltage amplitude known as pulse code modulation ("PCM"). The PCM signal is transmitted to the subscriber over the analog channel, and then translated back to the digital information.

This digital-to-analog ("D/A") and analog-to-digital ("A/D") conversion of octet values to PCM voltage levels are typically performed in accordance with a non-linear quantizing rule. In North America, this conversion rule is known as $\mu$-law. A similar non-linear sampling technique known as A-law is used in other geographic areas of the world such as Europe. The non-linear A/D and D/A conversion is generally performed by a codec (coder/decoder) device located at the interface between the digital network and the analog channel.

For high data transmission rates over the analog channel, it is desirable to use a large number of PCM levels to represent the transmitted data. Often, however, only a selected number of PCM levels, known as a constellation of signal points, is used due to the impairments of the transmission channel. For example, on noisy channels it is difficult to distinguish between PCM voltage levels that are spaced close together, resulting in data transmission errors. To distinguish between different PCM levels, the noise level may require an increased spacing between PCM levels. The spacing between selected PCM voltage levels can be increased by using a reduced subset of the available PCM levels. Using a limited number of PCM levels, however, limits the data rates that may be achieved on noisy channels.

In addition, the selection of PCM levels is also constrained by limits on the amount of power that can be transmitted onto the analog channel. The power of the transmitted PCM levels must be below this defined power level. Thus, higher power PCM levels that increase the spacing between PCM levels may not be selected. In this way, the power level limits the selection of constellation points and thus the noise performance and data transmission rate.

Accordingly, it is desirable to select signal constellations having PCM levels spaced at least a minimum distance apart as large as possible to improve noise performance, while staying within the allowable power level.

SUMMARY OF THE INVENTION

It is an object of the present invention to address the problem of selecting a constellation of PCM levels to enable the transmission of data at high transmission rates. In particular, it is an object of the present invention to select a constellation of points optimized to communicate at high data rates over analog channels which are subject to noise.

It is another object of the present invention, to select constellation points of PCM levels so that the minimum distance between PCM levels of the selected constellation are as great as possible while maintaining the power level of the constellation below a defined power limit.

It is a further object of the invention to select constellation points that reduce the number of PCM levels that are at the minimum distance spaced apart.

It is yet another object of the invention to select constellation points that provide the same number of points at lower power levels.

Described herein is a method and apparatus that improves the noise performance of modems transmitting data using a constellation of selected PCM levels. The described embodiment selects a constellation of points having a total number of PCM levels and an upper power limit that improves the noise performance of the modem. The described embodiment selects PCM levels to increase the minimum spacing between PCM levels as great as possible while staying within the upper power limit for a constellation having a desired number of PCM levels. To minimize the power level of the selected constellation, constellation points are selected starting from PCM levels at linear values near zero to PCM levels at higher linear values. To improve noise performance, the number of occurrences of the minimum distance between PCM levels is also reduced without exceeding the upper power level. To reduce occurrences of the minimum distance between constellation points, PCM levels at the minimum distance from the previously selected PCM level may be skipped. The number of PCM levels spaced at the minimum distance is thus reduced to an optimum number without exceeding the upper power level. Software, firmware or hardware may be utilized for implementing the invention.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 1:
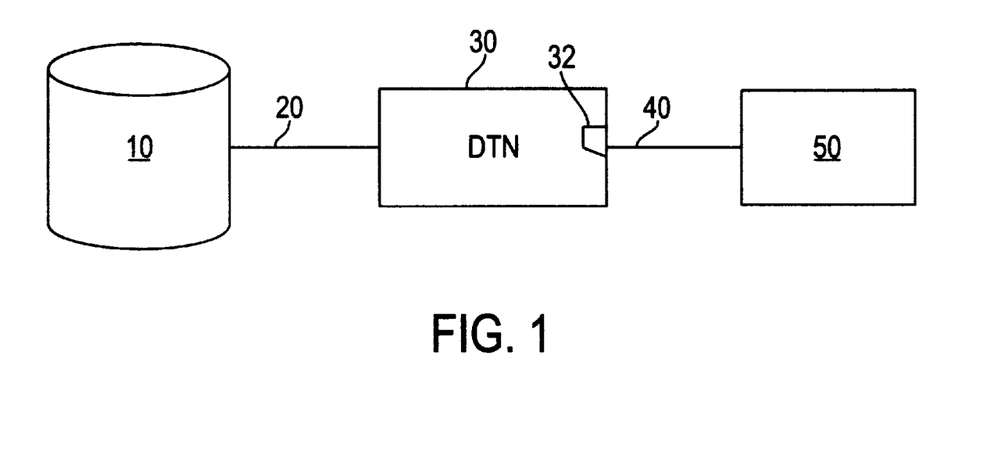
FIG. 1 depicts a communications network with a data source having direct digital access to the DTN in accordance with the present invention.

FIG. 1 shows a block diagram of a data distribution system including a data source 10, or server, having a direct digital connection 20 to a digital telephone network ("DTN") 30. A subscriber 50 is connected to the DTN 30 by an analog channel 40. Preferably, the DTN 30 routes signals from the data source 10 to the analog channel 40. Typically, the analog channel 40 is a subscriber loop between the telephone company office and the subscriber's home.

Figure 2:
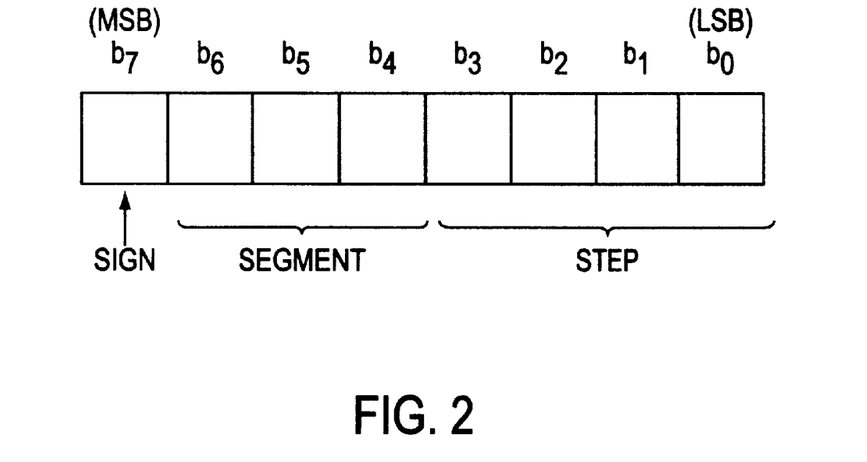
FIG. 2 shows the elements of a $\mu$-law PCM codeword used to transmit data in the communications network of FIG. 1.
Figure 3:
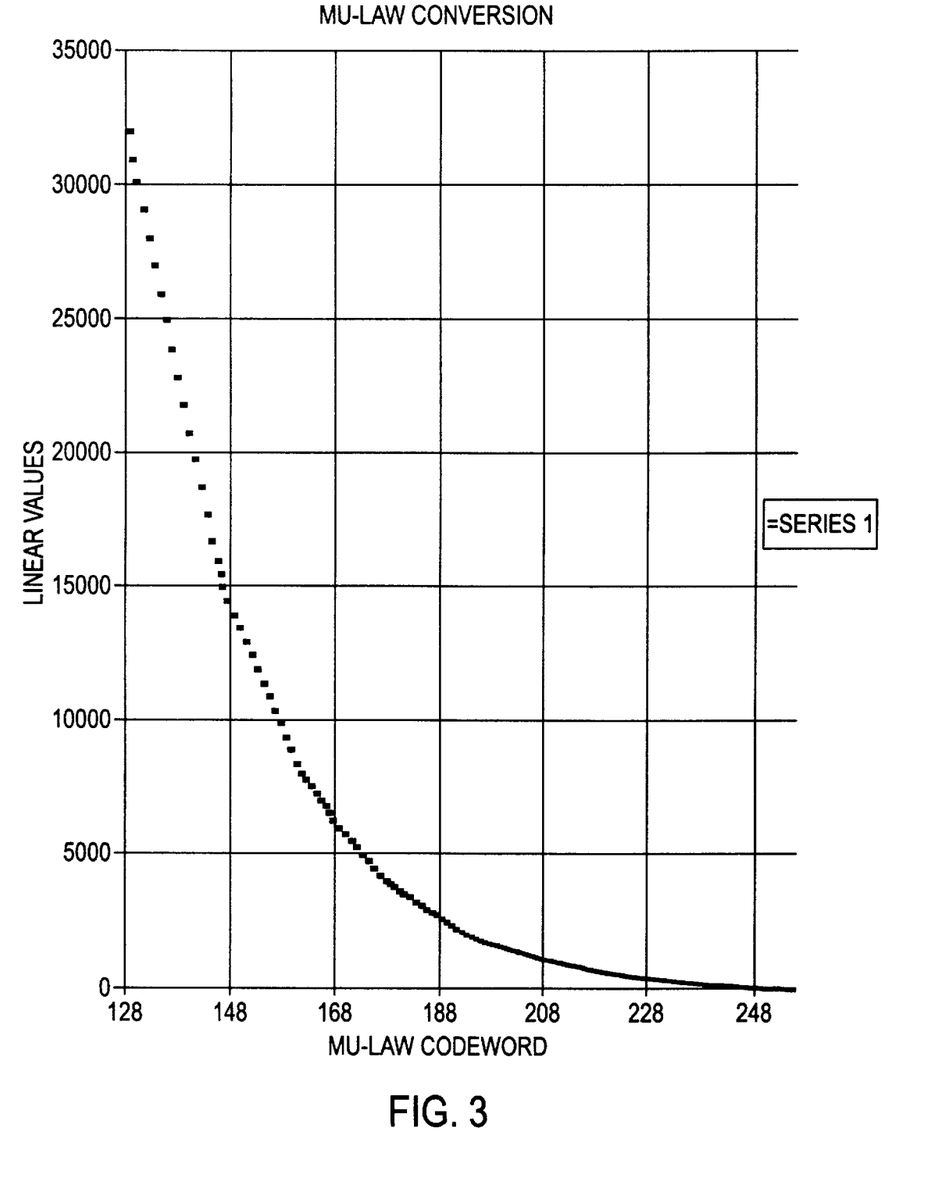
FIG. 3 shows a $\mu$-law PCM codeword to linear conversion graph used to convert the codeword of FIG. 2 to a linear value.

In the system of FIG. 1, digital data is transmitted by the DTN 30 as 8-bit bytes or octets, shown in FIG. 2, at the DTN clock rate of 8 KHz. At the DTN interface to the analog channel, a codec 32 converts each octet to one of 255 analog PCM voltage levels or linear values to be transmitted over the analog channel and received at the client location. As shown in FIG. 3, the octets correspond to quantization levels that are non-uniformly spaced and follow a generally logarithmic curve. In other words, the increment in the analog voltage levels produced from one octet to the next is not linear, but depends on the mapping as shown in FIG. 3.

Figure 4:
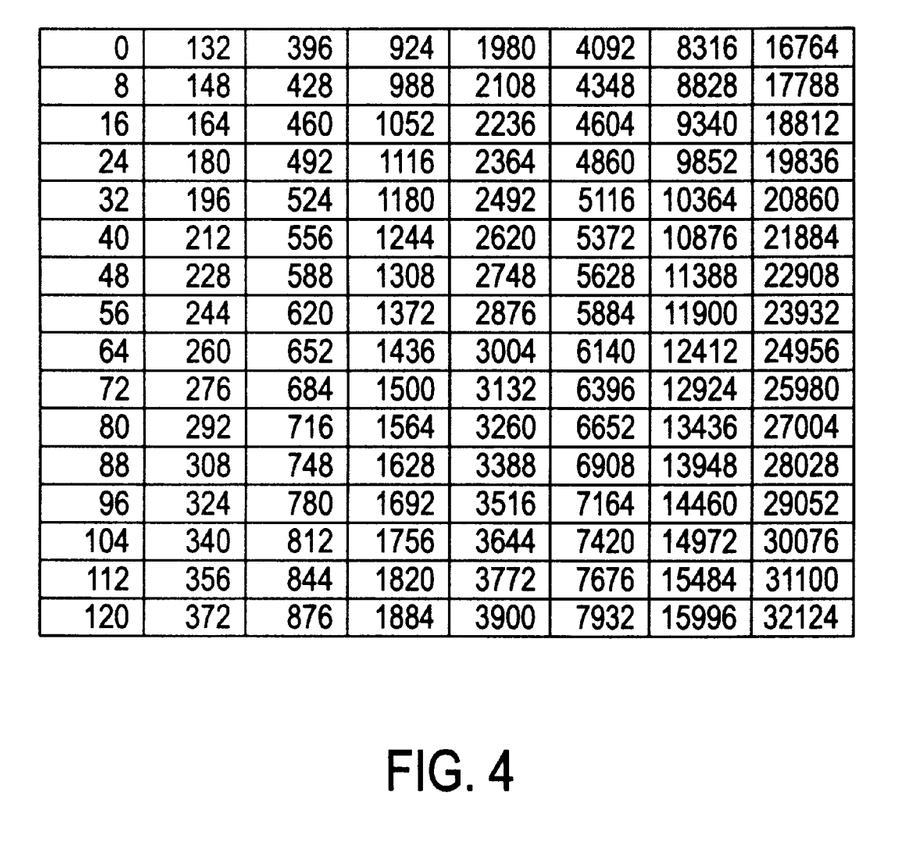
FIG. 4 shows a table of the linear PCM values of FIG. 3.

FIGS. 2 and 4 show the 8-bit octets as $\mu$-law PCM levels and how they correspond to linear values. As seen in FIG. 4, the linear values are divided into 8 different segments determined by bits $b_6$ to $b_4$ of FIG. 2. Each of the 8 segments has a constant quantization or linear spacing between $\mu$-law PCM values which is different from each of the other 7 segments. For example, a first segment (0, 8, 16, . . . ) has a linear spacing of 8 between $\mu$-law PCM values, the second segment (132, 148, 164, . . . ) a linear spacing of 16, the third segment (396, 428, 460 . . . ) a linear spacing of 32, and so forth until the eighth segment has a linear spacing of 1024 between $\mu$-law PCM values. Once one of the 8 segments is determined by bits $b_6$ to $b_4$, the particular linear value within a segment is determined by $b_3$ to $b_0$. Thus, the $\mu$-law PCM values correlate 8-bit bytes to analog voltage levels in a non-linear fashion.

In one embodiment, a constellation of selected PCM levels having a total number of constellation points (number of PCM levels) and an upper power level limit is selected from the linear values in FIG. 4. To improve the noise performance, it is desirable to select linear values that are spaced as far apart as possible. The maximum distance constellation points can be spaced apart, however, is limited by the number of available PCM levels. With $\mu$-law PCM there are 255 available PCM levels. Accordingly, there is a minimum linear distance that selected PCM levels will be spaced apart depending on the total number of desired PCM levels.

The spacing of constellation points is also limited by the power limits imposed on the constellation. Typically, the selected constellation points cannot have a transmitted RMS power that exceeds an upper power limit over a standard length of time. For example in the United States, the transmitted power level of the selected constellation over a 3 second time interval cannot exceed the predefined power limit. Alternatively, the power limit may also be defined as a peak PCM codeword which cannot be exceeded. Thus, PCM levels requiring higher transmit power cannot be selected as part of the constellation, further limiting the linear distance PCM levels can be spaced apart. In a present embodiment, it is desirable that the constellation points have a minimum spacing, which is as great as possible, but remains below the upper power limit.

In addition to increasing the minimum distance between constellation points as great as possible, it is desirable to reduce the number of PCM levels spaced at the minimum distance to further improve noise performance. By reducing the number of PCM levels spaced at the minimum distance apart, the probability of transmission errors can be further reduced.

The described embodiments provide iterative procedures that select constellation points meeting the above criteria. The described embodiments can be used to select constellation points that have a minimum distance between PCM levels as great as possible while reducing the number of occurrences of this minimum distance for a desired constellation size and allowed power. Using the present embodiment, a constellation of PCM levels can be selected to optimize noise performance of the modem.

To determine the constellation for a desired constellation size and allowed peak power using an iterative procedure, an initial minimum distance between constellation points, Dmin in this example, is chosen. The initial Dmin should be chosen to be large enough to insure that it is greater than necessary. For example, the initial Dmin can be twice the peak allowable PCM level divided by twice the number of constellation points minus 1. Dmin can also be determined by the available signal-to-noise ratio on the channel as empirically derived by those of skill in the art.

Constellation points are selected that meet the initial Dmin spacing starting from the lower linear values near zero to the upper linear values. For example, constellation points are chosen starting at zero such that they are spaced by a distance of the Dmin from each other. It should be understood, due to the unsigned PCM levels, the first constellation point should be chosen such that it has a linear value that is at least the initial Dmin/2 spacing from the zero linear value. The second constellation point is chosen such that it is spaced at least a linear distance of Dmin from the first selected constellation point. The third constellation point is chosen such that it is spaced from the second selected constellation point by at least Dmin. For example, for a Dmin of 128 the first constellation point will be 0+128/2=64, which corresponds to linear value 64. The second constellation point is 64+128=192, which corresponds to PCM linear value 192. The third constellation point is 192+128=320 of which the next greater linear value is 324.

In one embodiment of the invention, the constellation of PCM values are selected starting at the lower linear values to the higher linear values as described above. Selecting constellation points starting from the zero linear values results in a constellation of PCM levels that have a lower power for the same number of points and Dmin.

The PCM levels are selected in this manner until either one of two conditions occurs: (1) the upper power limit is reached before selecting the desired number of constellation points or (2) the desired number of constellation points are selected and the upper power limit is not reached. If condition (1) is met, an upper power limit is reached before selecting the desired number of constellation points, the initial Dmin is too large for the desired constellation size. Dmin is reduced and the process is repeated, selecting constellation points starting again from zero to the higher linear values until one of the two conditions discussed above occurs. For example, Dmin may be reduced by one and the constellation selection process repeated.

If condition (2) is met, the desired number of constellation points are selected and the upper power limit is not reached, the constellation of PCM levels was successfully selected using that Dmin. The constellation points, size, power and Dmin is noted. The process of selecting PCM levels is then repeated for the successful Dmin, except that the first PCM level at the Dmin minimum spacing is not chosen or skipped. In other words, a PCM level at the minimum linear spacing from a previously selected PCM level, which would otherwise be selected, is not selected as part of the constellation. Rather, the next linear value which exceeds the Dmin is selected. For example, the minimum linear spacing between PCM values may be a Dmin of 128. If the previously selected linear value is 396, the next linear value meeting the Dmin spacing of 128 is 524. However, linear value 524 is spaced exactly the Dmin of 128 from the previous linear value of 396. Thus, linear value 524 is skipped and not used as a constellation point. Instead, linear value 556, the next linear value that exceeds the Dmin spacing of 128 from 396, is selected.

Figure 5A:
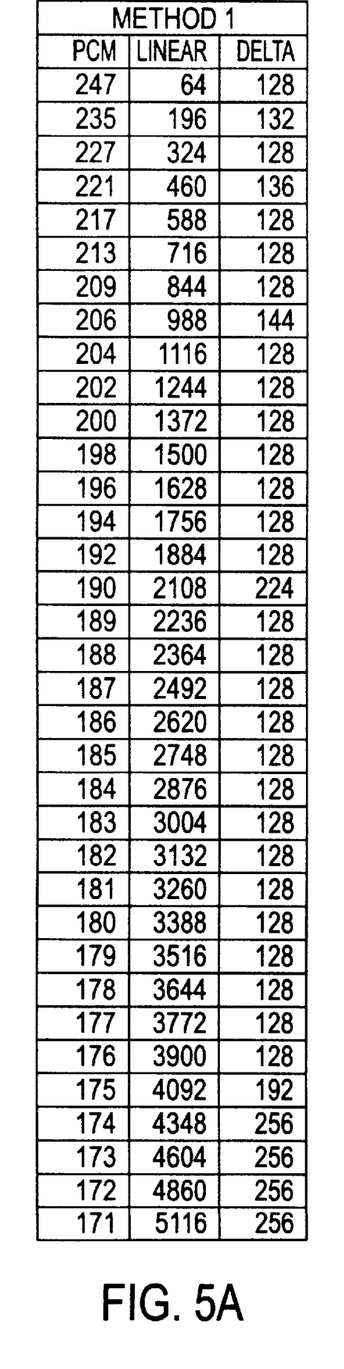
FIGS. 5a and 5b shows two examples of constellations of PCM values selected using the described embodiments of the constellation selection procedure.
Figure 5B:
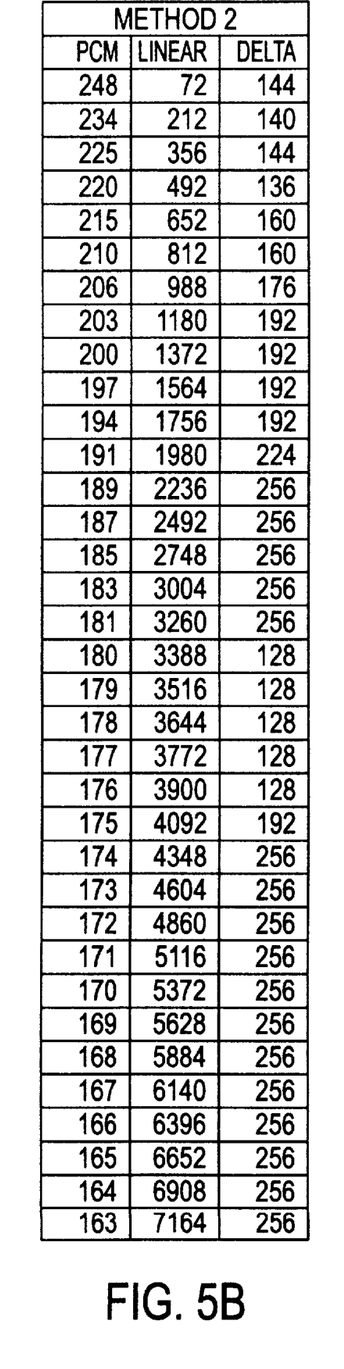

Skipping constellation points at the Dmin reduces the probability of transmission errors due to confusion with other PCM levels as a result of their proximity. For example, for a constellation size of 70 points (PCM levels) and an upper peak power linear value of 14460 (PCM level=147) the selected PCM levels should be a linear value of 128 apart. As shown in FIG. 5a, simply choosing linear values spaced at the Dmin results in 26 PCM levels that are at the Dmin spacing. As shown in FIG. 5b, by skipping selected values at the Dmin spacing, the number of selected PCM levels at the Dmin can be reduced to 5 while still staying within the upper power level. Reducing the number of PCM levels at the Dmin from 26 to 5 can significantly reduce the probability of transmission errors.

This process of selecting PCM levels is repeated, skipping an increasing number of PCM levels at the Dmin spacing until the upper power limit is reached. Once the upper power limit is reached, the maximum Dmin and skip count for a desired constellation size is determined.

Using this iterative procedure, a family of constellations that meet the power level for each constellation size can be generated. For each constellation size, the family of selected constellations may have different Dmin spacings and skip counts. From this family of constellations, a constellation can be selected to represent the transmitted data. The selected constellations can be generated and stored or generated as necessary. Typically, the constellation with the largest Dmin spacing will achieve the best noise performance. A desired constellation can thus be selected accordingly. Other considerations such as Robbed-Bit-Signaling may also impact the selection of constellation.

While the present embodiment has been described as a method, it is easily implemented as hardware in the form of a custom gate array or an application specific integrated circuit (ASIC). A variety of software, firmware, and hardware can be used to implement the embodiments described herein. In a representative embodiment, the described software is implemented in assembly language to run on a digital signal processor. Of course, a microcontroller or a personal computer are also suitable. The software may be stored and executed in either firmware or a disk-based operating system. An example of such firmware is available in modems from 3Com Corporation 8100 North McCormick Boulevard, Skokie, Ill. 60076.

Figure 6:
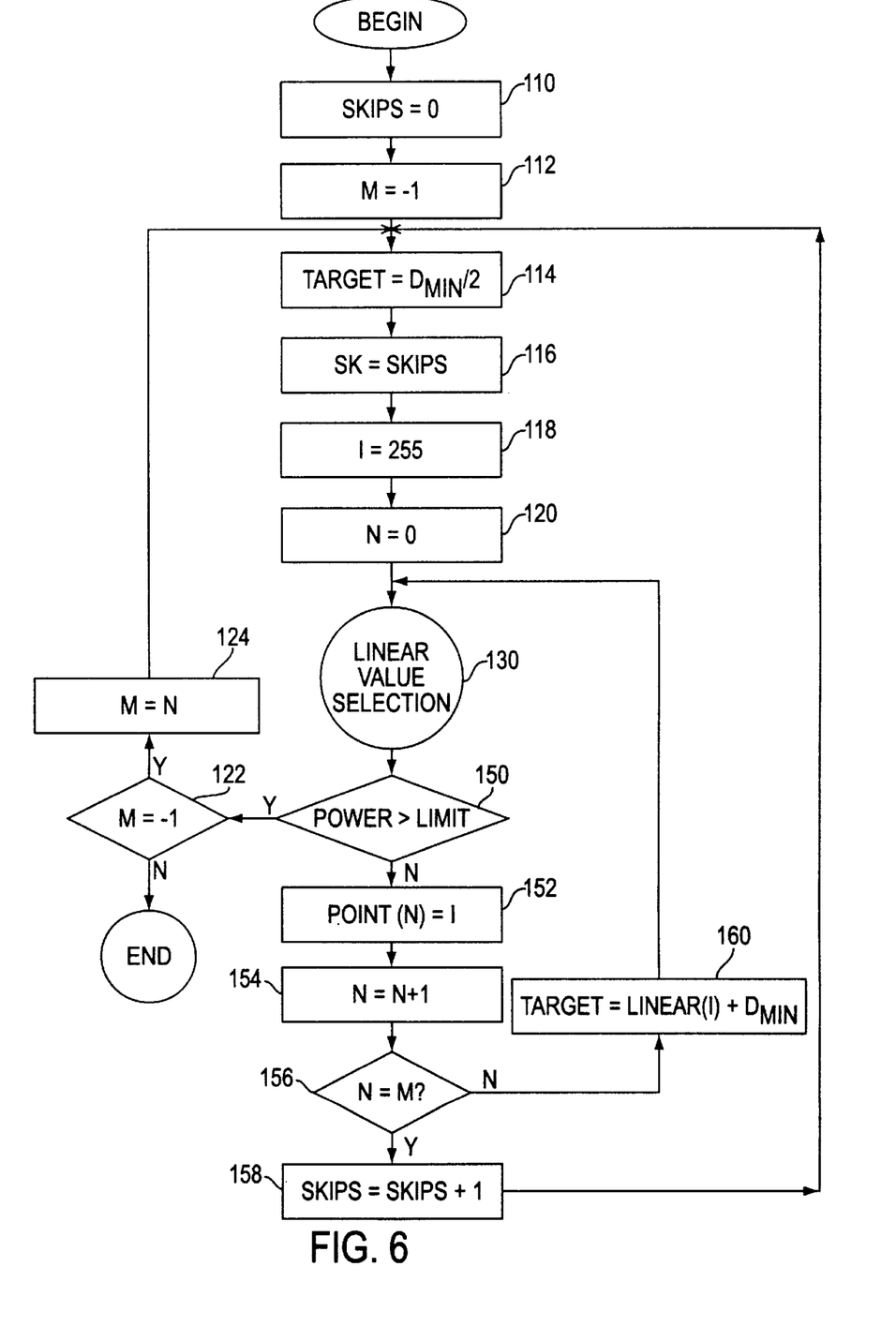
FIG. 6 is a flow chart of a first embodiment of the described constellation selection procedure.

Referring now to FIG. 6, a flow diagram of a first embodiment of the constellation selection procedure is described. In this example, the Dmin can be empirically determined by the signal-to-noise ratio ("SNR") on the channel as referred to above. To begin the constellation selection process, the number of points at the Dmin, variable named "SKIPS" in this example, is initialized to zero at block 110. Initially, no linear values at the minimum spacing will be skipped.

The number of unsigned constellation points, variable "M" in this example is initialized to a −1 value in block 112. Initially, M equal to −1 is used as a flag until the first time the power limit is exceeded. When the power limit is exceeded in block 150, M is set to N in block 124.

To select constellation points starting at the zero linear value, the initial candidate linear value, variable "TARGET" in this example, is set to Dmin/2 in block 114. As explained above, the initial TARGET value is set to Dmin/2 due to the unsigned nature of the linear values. Variable "SK" keeps track of the number of TARGET linear values at the Dmin spacing that have been skipped by the constellation selection procedure. The value of variable SK is initialized to the number of Dmin values that will be skipped in block 116. Initially, this value is zero.

Variable "I" represents the possible μ-law PCM codes from 255 to 128 that can be selected. To select from the zero linear values in the preferred embodiment, the initial I value is set to 255 in block 118. Variable "N" tracks the number of constellation points that have actually been selected and is initialized to zero in block 120.

Constellation points are selected among PCM code words corresponding to candidate linear values by "Linear Value Selection" block 130. The candidate points are the PCM linear values shown in FIG. 4. The candidate linear values selected by block 130 are those having at least a Dmin spacing from the adjacent selected constellation point. As described below in more detail, candidate linear values may be not selected as a constellation point because they do not meet the minimum spacing or because they are skipped.

After a linear value is selected, the power level is checked in block 150. The power level may be defined relative to a standard RMS definition zero dBm tone. If the selected linear value exceeds the power level, the M flag is checked in block 122. If M equals −1, the number of constellation points M is set equal to N in block 124 and the process repeated.

If the power level is not exceeded, the linear value is selected as a constellation point in block 152 and the number of selected constellation points N is incremented in block 154. If the desired number of constellation points M is not yet reached 156, the TARGET value for the next candidate constellation point is set at the selected linear value plus Dmin in block 160. The process of selecting candidate constellation points is repeated until the desired number of constellation points M have been selected 156 or the power limit reached 150.

If the desired number of constellation points have been chosen without exceeding the power level limit, the number of points at the Dmin spacing can be reduced by setting the SKIPS variable at block 158. The selection of constellation points at blocks 130 to 156 is repeated, skipping constellation points at the Dmin spacing. Each time the selection of the desired number of constellation points succeeds without exceeding the power level, it is repeated, skipping an increasing number of constellation points at the Dmin spacing until the power level limit is exceeded in block 150. When the power level is exceeded, the previously selected constellation has the maximum number of skipped constellation points without exceeding the power level for that Dmin. This process can be repeated for different Dmin spacings based on measured SNR.

Figure 7:
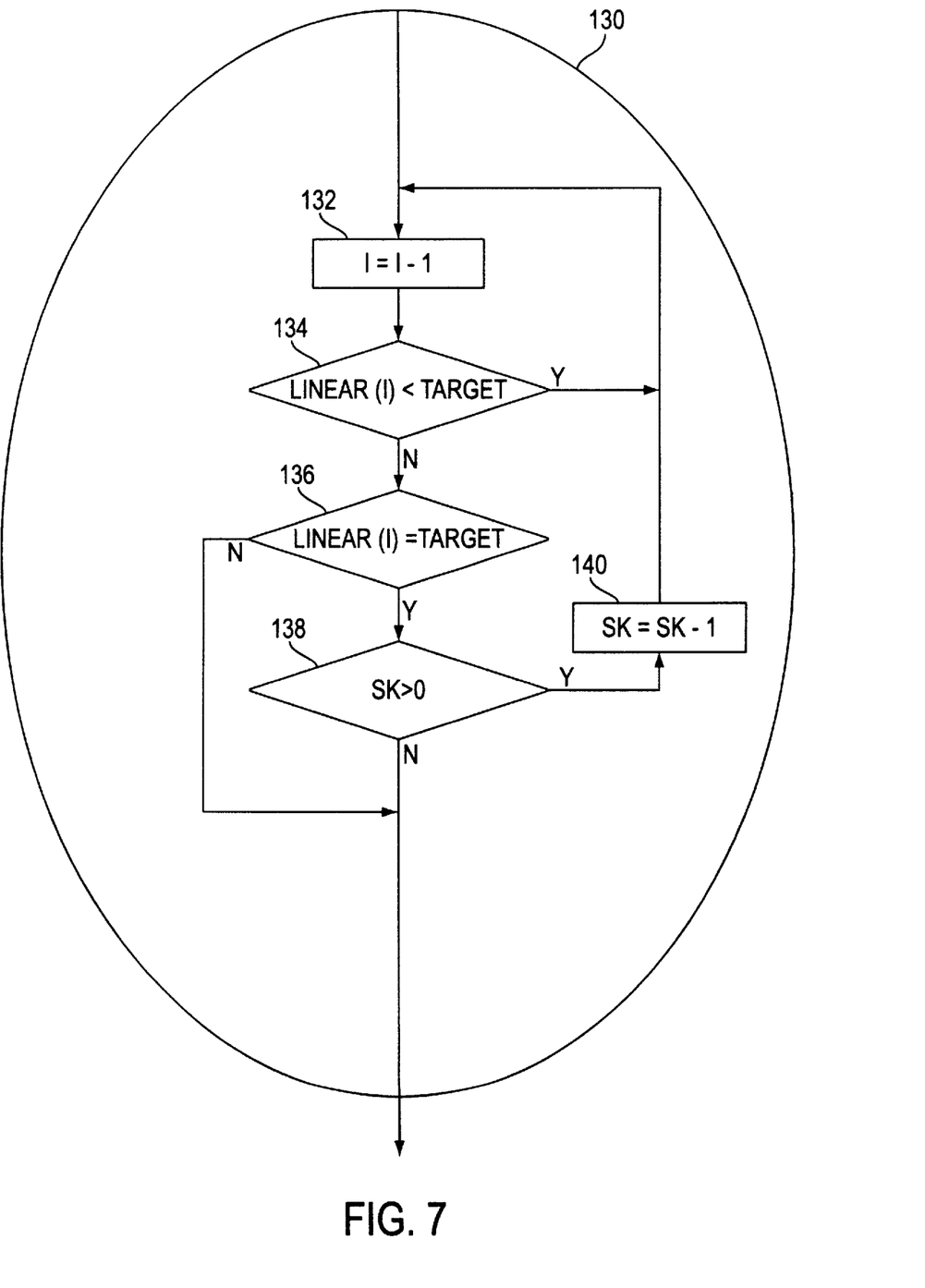
FIG. 7 is a flow chart of the Linear Value Selection process of FIG. 6.

Referring now to FIG. 7, the Linear Value Selection block 130 is described. The PCM level I is decremented to check whether the next PCM value is a constellation point in block 132. The linear value corresponding to PCM code I, "Linear (I)" in this example, is checked to determine whether it is less than the TARGET value 134. If Linear(I) is less than the TARGET value, it does not have a spacing greater than or equal to the required Dmin and is not selected. The next Linear(I) is then checked at block 132. If the Linear(I) equals the TARGET value 136, the candidate linear value is at the Dmin spacing from the previously selected constellation point and will either be selected or skipped. If the skip count SK is greater than zero 138, the candidate point should be skipped and SK updated 140. If the skip count SK is zero, the point is selected into the constellation.

Referring again to FIG. 6, the Linear Value Selection 130 is repeated until the desired number of constellation points M are selected 156 or the power level limit is exceeded 150 as previously described. If the desired number of constellation points M is reached, the number of Dmin points to skip (SKIPS) is increased 158. The Linear Value Selection 130 is started over at block 114, skipping an increased number of constellation points at the Dmin spacing. This Linear Value Selection 130 can be repeated, skipping an increased number of points at the Dmin until the power level is exceeded.

Figure 8:
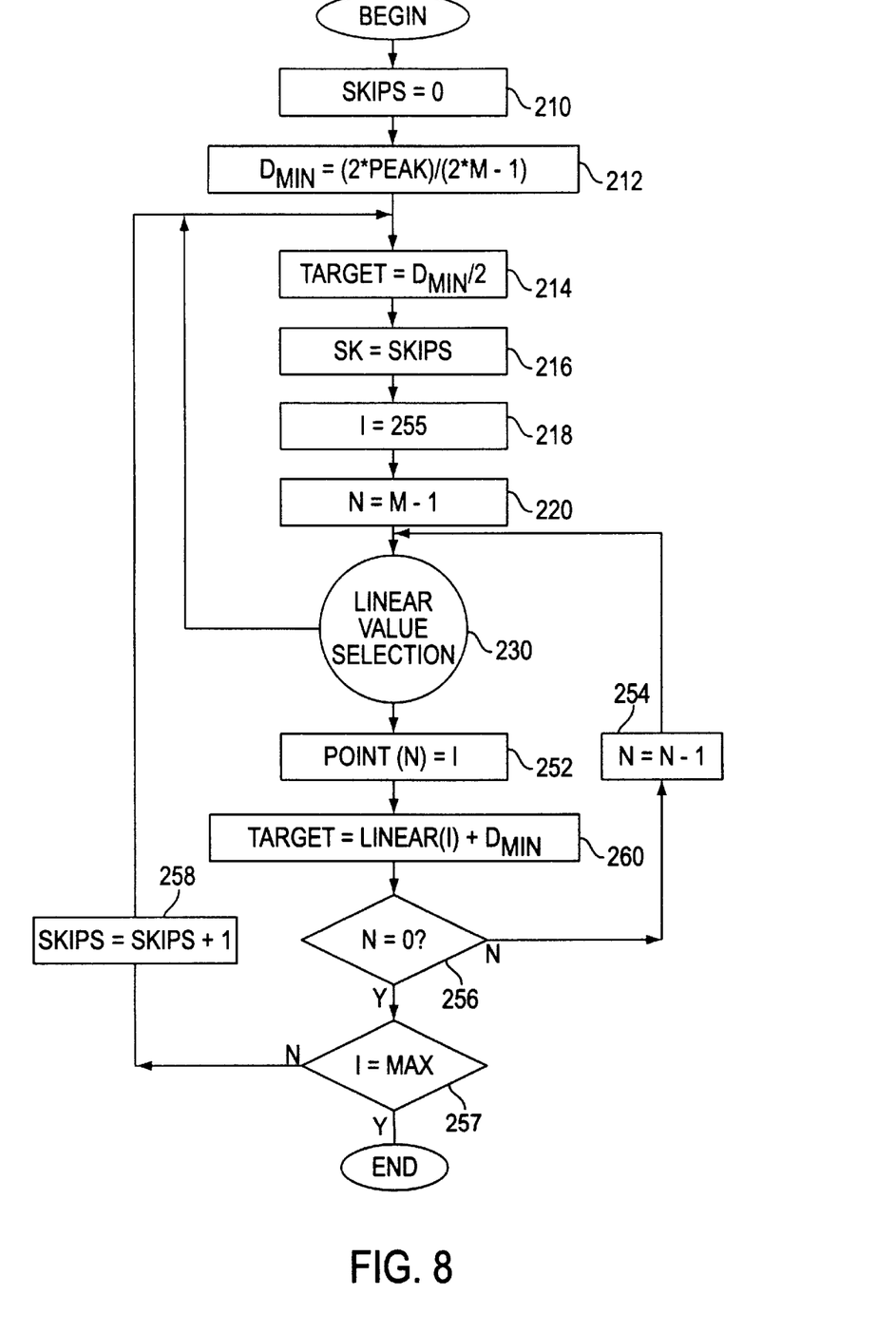
FIG. 8 is a flow chart of a second embodiment of the constellation selection procedure.

FIG. 8 shows a second embodiment of the constellation selection procedure. In this embodiment, "M" represents a desired number of constellation points and "Max" refers to the PCM code representing the maximum desired linear value. "Peak" defines a peak PCM linear value (using $\mu$-law PCM code 128). Dmin is set to twice the Peak divided by twice the desired number of constellation points M minus 1 (Dmin=(2* Peak)/(2*M-1)) in block 212. The "SKIPS" variable is also set to 0 in block 210. Initially, no linear values at the minimum spacing will be skipped.

As in the first described embodiment, the "TARGET" variable identifying the candidate linear value is set to Dmin/2 in block 214, the "SK" variable identifying the number of candidate linear values skipped is set to SKIPS in block 216, and the "I" variable identifying the PCM code is set to 255 in block 218. In this embodiment, "N" is initialized to the desired number of constellation points M minus 1 (N=M−1) as shown in block 220.

The Linear Value Selection block 230 selects constellation points from candidate PCM code words corresponding to linear values. Again, the candidate constellation points are selected from the linear values of FIG. 4. The function of Linear Value Selection block 230 is described in connection with FIG. 9.

After the Linear Value Selection 230, the linear value is selected as a constellation point in block 252, and the TARGET value for the next constellation point is set at the selected linear value plus Dmin in block 260. Before selecting the next constellation point, the number of constellation points currently selected is checked against the desired number of constellation points. Additional constellation points are to be chosen if N is not equal to 0 in block 256. The number of constellation points selected is decreased in block 254 and the Linear Value Selection repeated 230 for the next TARGET candidate linear value.

If N is equal to 0 in block 256, the desired number of constellation points have been chosen, and the last selected PCM code I is checked to see if it is equal to the maximum PCM limit Max in block 257. If the last selected PCM code is equal to Max in block 257, the constellation selection process is complete. If the last selected PCM code is not equal to Max, the skip count is increased in block 258, and the constellation selection process started at over at block 214 with the increased skip count. Preferably, the constellation selection is repeated until the last selected PCM code is equal to the maximum PCM limit in block 257.

Figure 9:
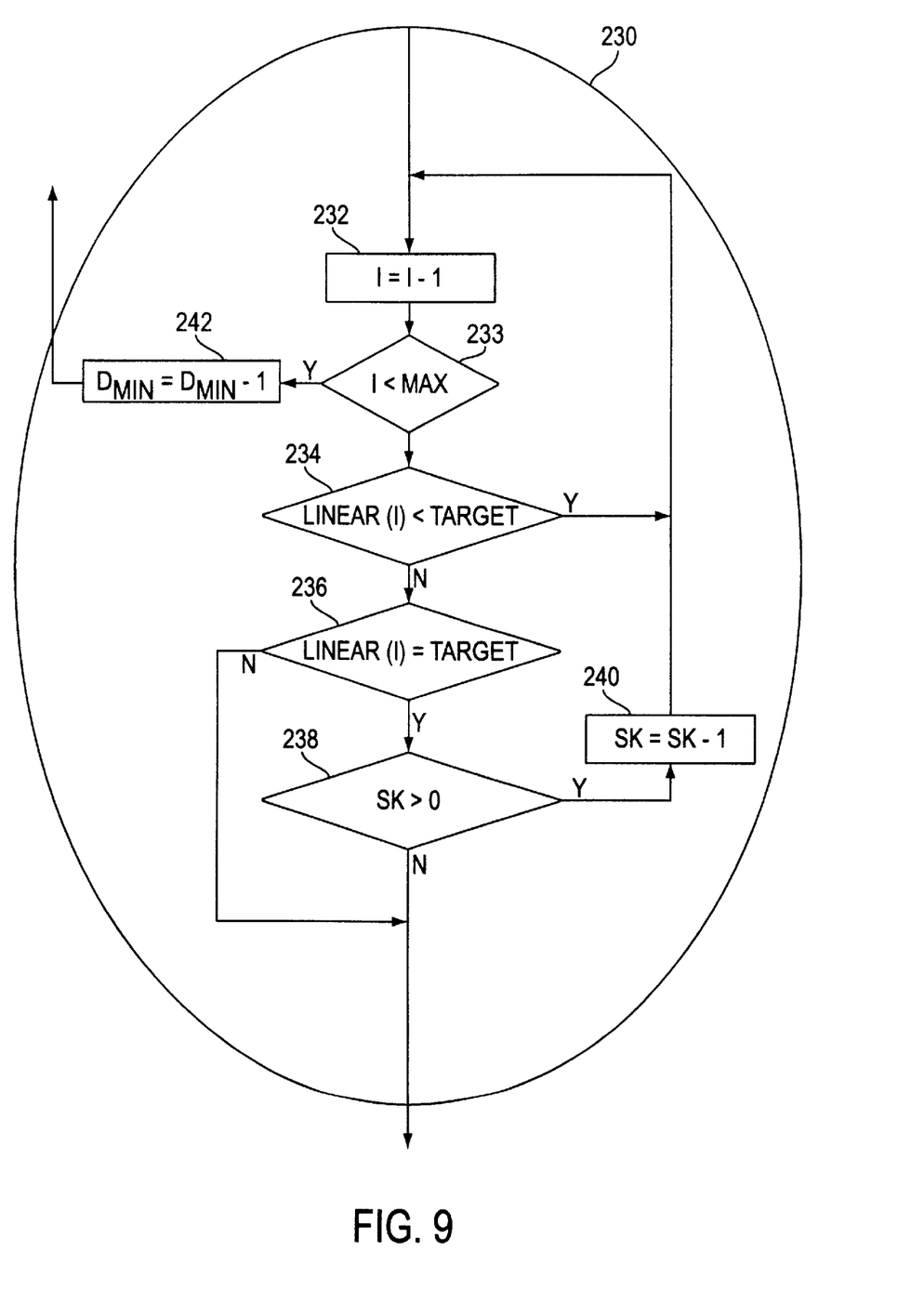
FIG. 9 is a flowchart of the Linear Value Selection process of FIG. 8.

Referring now to FIG. 9, the Linear Value Selection block 230 of the second embodiment is described. The PCM level I is decremented in block 232 to check whether the next candidate PCM level will be selected as a constellation point. First, the PCM level I is compared against Max, the maximum PCM code level. If I is less than Max, the PCM level has exceeded the limit. Dmin is reduced in block 242, and the constellation selection process repeated at block 214.

If I is not less than Max, the candidate linear value corresponding to PCM level I, Linear(I), is compared to the TARGET value. If Linear(I) is less than the TARGET, the candidate does not have the required Dmin spacing, and the next linear value is checked starting at block 232. If the Linear(I) is not less than or equal to the TARGET at block 238, it will be selected into the constellation at block 252 (FIG. 8). If the Linear(I) is equal to the TARGET at block 238, it is at the Dmin spacing from the previously selected constellation point, and will either be selected or skipped according to the skip count SK in block 238. If the SK is not greater that zero, the PCM level is selected at block 252 (FIG. 8). If SK is greater than zero, the point is skipped and the skip count SK decremented. The next linear value is checked at block 232.

As previously described in connection with FIG. 8, the Linear Value Selection 230 is repeated until the desired number of constellation points have been selected. FIG. 5b shows an example of a constellation that may be selected using this second described embodiment.

Using the constellation selection procedure of the described embodiments, a family of constellations having different Dmin spacing between constellation points and a different number of constellation points at the Dmin spacing can be generated as desired. By increasing the minimum distance between PCM levels of the selected constellation and reducing the number of constellation points at the Dmin, a constellation can be optimized for communication at high data rates over analog channels that are subject to noise. The present embodiment also selects constellation points such that the minimum distance between PCM levels of the selected constellation is as great as possible while maintaining the power level of the constellation below a defined power limit. Additionally, the present embodiment selects constellation points that provide the same number of points at lower power levels. These features of the present embodiment can be utilized to improve noise performance by reducing transmission errors or increasing the effective transmission data rate over the channel.

It is to be understood that both the foregoing general description and the following detailed description are exemplary and explanatory and are intended to provide further explanation of the invention as claimed. Numerous modifications and variations are possible. It is intended that the foregoing detailed description be regarded as illustrative rather than limiting. It is the following claims, including all equivalents, which are intended to define the scope of this invention.

We claim:

1. A method of selecting a constellation of pulse code modulation levels comprising the steps of:

identifying a power level limit below which the selected constellation of pulse code modulation levels should remain for transmission over a medium;

selecting a total number of pulse code modulation levels desired within the constellation;

determining a minimum distance between selected pulse code modulation levels;

selecting pulse code modulation levels starting from pulse code modulation levels at linear values near zero to pulse code modulation levels at higher values to minimize the power level of the selected pulse code modulation values; and skipping pulse code modulation levels at the minimum distance from the selected pulse code modulation level and selecting the next pulse code modulation level which exceeds the minimum distance.

2. The method of claim 1 wherein the minimum distance between selected pulse code modulation levels is maximized for a given power level limit.

3. The method of claim 1 wherein the minimum distance between pulse code modulation levels is determined in accordance with the noise level observed in the transmission medium.

4. The method of claim 1 wherein the selected pulse code modulation levels are transmitted by modem.

5. The method of claim 4 wherein the selected pulse code modulation levels are uniformly transmitted by the modem.

6. The method of claim 1 wherein the selected pulse code modulation levels are in one-dimension.

7. The method of claim 1 wherein the selected pulse code modulation levels are non-uniformly spaced.

8. The method of claim 1 wherein the pulse code modulation levels follow the A-law standard.

9. The method of claim 1 wherein the pulse code modulation levels follow the U-law standard.

10. A method of selecting a constellation of pulse code modulation levels to represent digital data transmitted over a modem comprising the steps of:

identifying a power level limit below which the selected constellation pulse code modulation levels should remain for transmission over a medium;

selecting a total number of pulse code modulation levels desired within the constellation;

determining a minimum distance between selected pulse code modulation levels;

selecting pulse code modulation levels for a desired number of pulse code modulation levels and the power level limit; and skipping a pulse code modulation level at the minimum distance from selected pulse code modulation level to improve noise performance.

11. The method of claim 10 wherein pulse code modulation levels are skipped while not exceeding the power level limit of the selected constellation pulse code modulation levels.

12. The method of claim 10 wherein pulse code modulation levels are skipped until a power level of the selected pulse code modulation levels meets power level limit.

13. The method of claim 10 wherein the minimum distance between selected pulse code modulation levels is maximized for a given power level limit.

14. The method of claim 10 wherein constellation pulse code modulation levels are selected starting from pulse code modulation levels near zero to pulse code modulation levels at higher values to minimize the power level of the selected pulse code modulation levels.

15. A method of selecting a constellation of pulse code modulation levels in pulse code modulation space to represent digital data transmitted over a modem comprising the steps of:

identifying a power level limit below which selected constellation pulse code modulation levels should remain for transmission over a medium;

selecting a total number of pulse code modulation levels desired within the constellation;

determining a minimum distance between selected pulse code modulation levels;

selecting pulse code modulation levels for a desired number of pulse code modulation levels and power level limit, to reduce the number of occurrences of the minimum distance between pulse code modulation levels without exceeding the power level limit; and skipping pulse code modulation levels which meet the minimum distance from the selected pulse code modulation level until the power level limit is met.

16. The method of claim 15, further comprising the steps of:

reducing the minimum distance between pulse code modulation levels if the power level limit is exceeded; and selecting pulse code modulation levels until the number of selected pulse code modulation levels is met without exceeding the power level limit.

17. The method of claim 15, further comprising the steps of:

skipping an increased number of pulse code modulation levels at the minimum distance between pulse code modulation levels if the power level limit is not exceeded; and selecting pulse code modulation levels until the number of selected pulse code modulation levels and the power level limit is met.

* * * * *